Jan. 10, 1950  G. SWIFT  2,493,786
MECHANICAL POSITION FINDER
Filed March 26, 1945  2 Sheets-Sheet 1
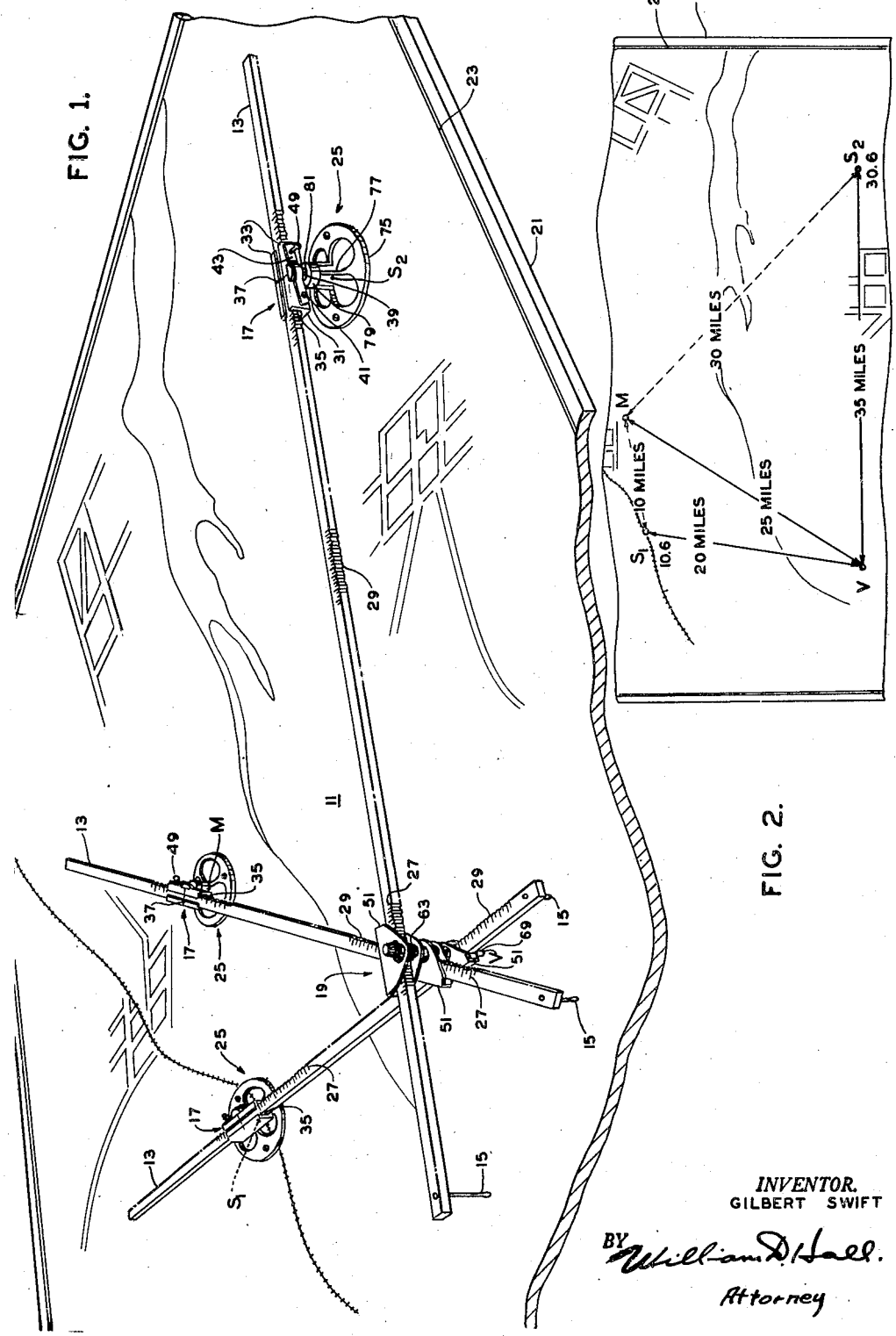
INVENTOR.
GILBERT SWIFT
BY William D. Hall.
Attorney Jan. 10, 1950     G. SWIFT     2,493,786
MECHANICAL POSITION FINDER
Filed March 26, 1945     2 Sheets-Sheet 2

INVENTOR.
GILBERT SWIFT.

BY William D. Hall.
Attorney

Patented Jan. 10, 1950

2,493,786

UNITED STATES PATENT OFFICE 2,493,786

MECHANICAL POSITION FINDER

Gilbert Swift, Red Bank, N. J.

Application March 26, 1945, Serial No. 585,001

6 Claims. (Cl. 33—189)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in geometrical instruments.

There are various systems for locating the positions of ships, aircraft, land vehicles, etc. For simplicity I shall discuss my present invention in this specification with reference to a system for locating land vehicles, but it is to be understood that it is not thereby intended to limit my invention to such system or such use.

Said system utilizes three radio transmitting stations, located at known geographical positions. One of these I shall denote as the "master" station, or "M", and the other two as "slave" stations, or "$S_1$" and "$S_2$." M sends out a radio signal and $S_1$ and $S_2$ pick up this signal and retransmit it so that the same signal is being sent out by the three stations. A land vehicle, which I shall call "V," whose geographical position is to be determined, is equipped with suitable radio receiving and timing apparatus. This apparatus receives the signals from the three stations M, $S_1$ and $S_2$ and indicates the time difference between its receipt directly from M and its receipt from each of $S_1$ and $S_2$.

The signal will travel directly from M to V. It will also travel from M to $S_1$, and at $S_1$ it will be received and retransmitted, and will then travel from $S_1$ to V. Its velocity will be 186,300 miles per second or, in round figures, one mile in five microseconds (which figure I will use in the following specification). The time of transmission of the signal from M to V will be solely dependent upon the distance MV. The time of transmission of the signal from M through $S_1$ to V will be the sum of three components: (a) The time for the signal to travel from M to $S_1$, dependent upon the distance $MS_1$; (b) the time for the signal to be received and retransmitted at $S_1$, dependent upon the time lag in the circuits of the receiving and retransmitting apparatus located at $S_1$; and (c) the time for the signal to travel from $S_1$ to V, dependent upon the distance $S_1V$.

(a) and (b) may be determined beforehand and their sum will remain a constant irrespective of the position of the vehicle V. If this constant is deducted from the time difference between the reception, at V, of the signal from M and the same signal retransmitted from $S_1$, and the remainder is translated into units of distance, it will be the difference between the distances MV and $S_1V$. If said remainder is positive, it will indicate that V is closer to M than to $S_1$; if negative, that V is closer to $S_1$ than to M. Thus, a hyperbola may be constructed geometrically, or may be selected from a family of hyperbolas prepared beforehand, all points of which will be further from $S_1$ than from M, or vice versa, by said distance. V will be located at some point along said hyperbola.

If the same procedure is repeated with respect to the other slave station $S_2$, another hyperbola will be obtained at some point of which V is also located. V will, therefore, be located at the intersection of the two hyperbolas. If there are two points of intersection, it will ordinarily be easy to decide which one indicates the true position, as the other point will usually be so far from the area where the vehicle V could be as to eliminate it, or other circumstances or means will determine the correct point.

It is an object of the present invention to provide a mechanical plotting instrument which will simply, rapidly and accurately locate the point where the two hyperbolas, aforesaid would intersect, but without the necessity of actually constructing or determining the hyperbolas themselves.

It is also an object of the present invention to provide a geometrical instrument which will ascertain the intersection or intersections of two hyperbolas wherein the points of generation and the constant difference in the distances from said points to each hyperbola are known.

Other objects and uses will appear from the following specification.

In the drawings:

Figure 1 is a perspective view of a plotting instrument, embodying my invention, in operative position upon a map;

Figure 2 is a plan view of the map of Figure 1, the distances being indicated;

In the following description a number of parts, which are identical or similar, will be given the same number and will be distinguished where necessary by the station M, $S_1$ or $S_2$, to which said part is related in the use of my instrument.

Figure 3:
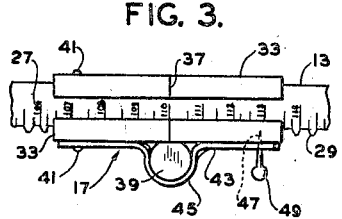
Figures 3, 4 and 5 are enlarged plan, front elevational, and right end elevational views, respectively, of one of the slides of Figure 1, in operative position on one of the arms.

As shown in Figure 1, my plotting instrument 11 comprises three arms 13, each of which is fitted with a finger 15, and a slide 17, the three arms being rotatably coupled together by a swivel shackle 19. The plotting instrument 11 is used on a plotting board 21 to which is fastened a map 23 and three station markers 25.

The three arms 13 are identical, each being an elongated rectangular metal bar having scale markings 27 on its upper surface and gear teeth 29 all along one side to form a rack. In the preferred embodiment of my device, the scale markings 27 run from "65" to "130," the units being equal to miles on the scale of the maps with which it is used. However, the numbering is arbitrary and may be changed to suit other requirements. Extending downwardly from one end of each arm 13 is a rod-like supporting finger 15, the three fingers 15 being similar, but of different lengths, so as to maintain the arms 13 at different heights above the map 23, as will be further discussed below. The lower ends of the fingers 15 rest upon the map 23, and are rounded so as not to tear it.

Figure 4:
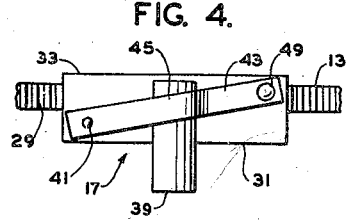
Figure 5:
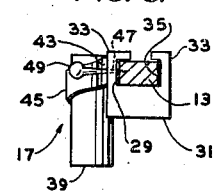

The three slides 17 (Figures 3, 4 and 5), are identical, each consisting of a rectangular metal base 31 having two longitudinal flanges 33, extending upwardly and then inwardly toward each other, so as to form a longitudinal channel 35 therebetween. The channel 35 slidably accommodates one of the arms 13. Etched across the flanges 33, midway between their ends, is a hairline 37, used in positioning the slide 17 relative to the scale markings 27 on one of the arms 13. Secured to the mid-point of one side of the base 31 of the slide 17 is a depending cylindrical pivot 39. Attached to the base 31 by a through rivet 41, is a spring steel strap 43, which extends along one side of the base, being curved outwardly at its central portion 45 so as to pass around the pivot 39. The strap 43 is disposed at an angle so that a horizontal detent 47, attached to it at one end, extends through a hole in one of the flanges 33 and impinges against the gear teeth 29 of one of the arms 13. Said detent 47 locks the slide 17 at any desired point along said arm 13. The slide 17 may be slidably repositioned on its arm 13 by retracting the detent 47 by means of a detent handle 49.

Figure 6:
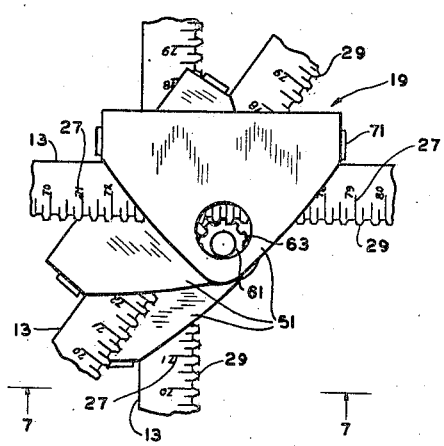
Figure 6 is an enlarged fragmentary plan view of the swivel shackle of Figure 1, the knob having been removed.
Figure 7:
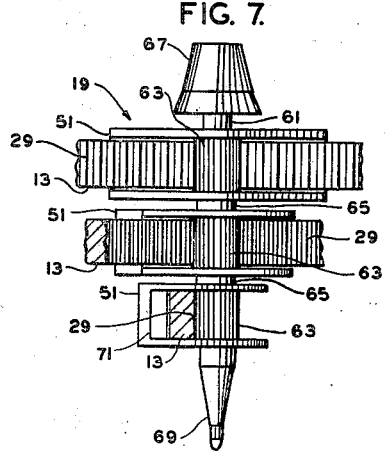
Figure 7 is an elevation along line 7—7 of Figure 6.
Figure 8:
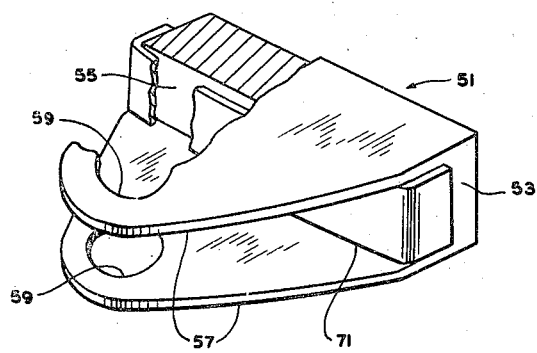
Figure 8 is a perspective view, partly broken away, of one clevis and one spring of the swivel shackle of Figures 6 and 7.
Figure 9:
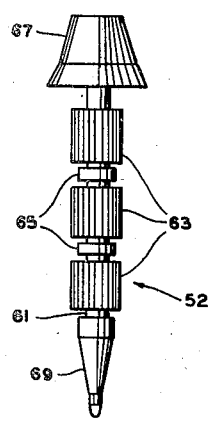
Figure 9 is an elevation of the pinion gear unit of the swivel shackle of Figures 6 and 7.

The swivel shackle 19 (Figures 6 and 7) is made up of three identical, independently rotatable clevises 51 (Figure 8) and a pinion gear unit 52 (Figure 9). Each clevis 51 comprises a rectangular back wall 53, having a vertical, flat inner surface 55 and two relatively thin, horizontally disposed, triangular flanges 57, extending outwardly from said wall 53 normal to said surface 55, the flanges being pierced by circular apertures 59, which are in register. Passing through the apertures 59 of all three clevises 51 is a pinion shaft 61 (Figure 9). Integral, axially, with said shaft 61 are three identical pinions 63, and two identical annular separators 65, alternately disposed and spaced from each other. The upper end of the pinion shaft 61 is fitted with a knob 67 for manual operation, and the lower end with a depending pointer 69, having a rounded tip so as not to tear the map 23 upon which it rests. In my preferred embodiment, the pinion gear unit 52, comprising the pinion shaft 61, the three pinions 63, the two separators 65 and the pointer 69 are made up from a single piece of metal. Also the apertures 59 are large enough to pass the pinions 63, so that the parts may be assembled for operation.

Each pinion 63 fits between the flanges 57 of one of the three clevises 51, the pinions 63 and clevises 51 being disposed at successive heights above the map 23 corresponding to the positions of the arms 13 as already mentioned. The separators 65 fit between adjacent clevises 51 so as to allow individual rotation of each clevis. Along the surface 55 of each clevis 51 is an arcuate leaf spring 71 (Figure 8), which is bent over the wall 53 at each end. Extending horizontally, between the flanges 57 of each clevis 51, is one of the arms 13, its gear teeth 29 being kept in mesh with one of the pinions 63 by the spring 71. The three arms 13 are identically positioned longitudinally in their respective clevises 51, so that, in any operative position, the same scale number on each of the three arms 13 is abreast of the pinion shaft 61. When the knob 67 is manually rotated, all three pinions 63 rotate with it, thereby causing the three arms 13 to move uniformly, longitudinally through the swivel shackle 19. As the three clevises 51 are individually rotatable, the three arms 13 are likewise individually rotatable about the pinion shaft 61.

The plotting board 21 is a flat rectangle of wood, large enough to accommodate the maps to be used. The map 23, laid out in rectangular coordinates, covers the locality of the three radio transmitting stations M, $S_1$, $S_2$ and is of a scale corresponding to the scale markings 27 on the arms 13.

Secured by screws to the map 23 and plotting board 21, directly over the geographical positions of the three stations M, $S_1$, $S_2$ are three station markers 25. Each of said markers 25 comprises a skeletal disc 75, cut away so as to leave as much of the map 23 exposed to view as possible, and four upwardly-extending legs 77, terminating in a cylindrical boss 79. Said boss 79 has an axial vertical bearing 81, adapted to rotatably support the pivot 39 of one of the slides 17. The three markers 25 are alike, except that they are of different heights so as to cooperate with the three fingers 15, similarly graduated in height, as already noted, to maintain the three arms 13 at successive levels (Figures 1 and 7) above the map 23, so that the racks on said arms may be in mesh with the three pinions 63 and so that said arms may be operatively rotated in planes parallel to the map without mutual interference.

In the operation of my device, if the slides 25 are positioned upon their respective arms 13 so that the scale readings on the arms extending to M and $S_1$ differ by the difference between the distances MV and $S_1$V, and the scale readings on the arms extending to M and $S_2$ differ by the difference between the distances MV and $S_2$V, and if the three pivots 39, on the three slides 17, are in place in their respective bearings 81 of the three station markers 25, then the pointer 69 will indicate the position of the vehicle V on the map 23. The steps to be taken to determine this position are best illustrated by a specific example.

Figure 2 (a plan view of the map 23 of Figure 1) indicates the distances as used in the specific example. The arms 13 of the plotting instrument 11 used in the example are numbered from "65" to "130," as previously described. The time lag in the receiving and retransmitting circuits at $S_1$ and $S_2$ will be assumed to be three microseconds, which, translated into distance, is equivalent to .6 miles. There has been written (as is my usual practice in using my invention) on the map the constants which have been determined in advance. Thus at $S_1$ there appears the figure "10.6," which is the sum of the distance $MS_1$ (10.) and the distance (.6) equivalent to the time lag at $S_1$. Similarly the figure "30.6" (30.+.6) appears at $S_2$.

The operator at vehicle V, located at the place indicated in Figure 2, ascertains from the receiving and timing apparatus that a signal is received 28 microseconds later from $S_1$ than from M, and 203 microseconds later from $S_2$ than from M. The timing apparatus is so calibrated that it computes the time difference in their distance equivalents (5.6 and 40.6 respectively) and also increases them by 100 (as I have arbitrarily chosen "100" as the base number) so that the actual readings will be "105.6" and "140.6" respectively. The slide 17 on the center arm 13 will be set at the base number "100" of the scale markings 27 on that arm and its pivot 39 will be positioned in the bearing 81 of the station marker 25 at the station M. In order to ascertain the setting for the slide 17 on the left arm 13, which will extend to $S_1$, the operator will subtract the constant for $S_1$ (as determined beforehand and written on the map) from the difference of time of reception of a signal from M and from $S_1$ (as indicated by the timing apparatus), or 105.6—10.6=95. The slide 17 on the left arm 13 is accordingly set at "95" on that arm and the pivot 39 of said slide is dropped into place in the bearing 81 at $S_1$.

A similar computation for $S_2$ will be 140.6—30.6=110. The slide 17 on the right arm 13 will accordingly be set at "110." It will now be necessary to adjust the instrument 11 so that the pivot 39 on the right arm 13 will drop into place in the bearing 81 at $S_2$. To accomplish this, the knob 67 is manipulated until the pivot 39 drops into place. The pointer 69 will now indicate the location of the vehicle V.

Upon measurement on the map, the vehicle V will be found to be 25 miles from M, 20 miles from $S_1$, and 35 miles from $S_2$. It will be noted that the five unit difference between the settings ("100," "95") of the slides 17 on the arms 13, extending to M and $S_1$ respectively, indicates the actual five miles difference in distance between MV and $S_1$V; and the ten unit difference between the slide settings ("100," "110") on the arms 13, going to M and $S_2$ respectively, indicates the actual ten mile difference in distance between MV and $S_2$V. The setting on arm 13, extending to $S_1$, is in a negative direction (less than "100") as V is nearer to $S_1$ than to M; the setting on arm 13, extending to $S_2$, is in a positive direction (more than "100") as V is further from $S_2$ than from M.

It is thus seen that the operator at V need but perform two simple subtractions to locate his position with my instrument. Such simplicity is particularly advantageous in determining the position of a military vehicle in time of battle. The operator at V need know nothing about the technical operation of the system or the geometrical construction of hyperbolas. The actual operation of my instrument on a plotting board need not even be done at the vehicle, but may be done at a base station to which the time differences indicated by the timing apparatus may be relayed by radio.

Although I have described a system utilizing three stations and an embodiment of my invention having three arms and associated parts, it is to be understood that they need not be limited to three.

I claim:

1. A geometrical instrument to ascertain an intersection of two hyperbolas, comprising three racks; three pinions, one pinion being in mesh with each of said racks, said pinions being connected for mutual operational rotation; three markers respectively positioned along said racks, the positions of at least two of said markers being adjustable.

2. An instrument to determine an intersection of two hyperbolas, comprising a pinion member; three racks, in mesh with said pinion member and individually rotatable about said pinion member; a pivot on one of said racks; two pivots, respectively longitudinally positionable along the other two of said racks; two means to rotatably sustain two of said pivots; a pointer, sustained by the pinion member.

3. A position determining instrument, comprising three elongated arms; a shackle member in engagement with said arms, said arms being conjointly, uniformly, and longitudinally movable with respect to said shackle member, and at least two of said arms being individually rotatable about an axis of rotation extending through said shackle member, said axis of rotation being normal to the longitudinal axes of said arms; three markers; three pivots, one attached to each of said arms, at least two of said pivots being movable to a plurality of positions along at least two of said arms, and said three pivots respectively being engageable with said three markers.

4. A position determining instrument, comprising three elongated arms, a shackle member in engagement with said arms, said arms being conjointly, uniformly and longitudinally movable with respect to said shackle member, and said arms being relatively rotatable in parallel planes, about an axis of rotation normal to said planes and running through said shackle member; three markers; a pivot attached to each of said arms, at least two of said pivots being movable to a plurality of positions respectively along at least two of said arms, and said three pivots respectively being engageable with said three markers.

5. A position determining instrument, comprising a map; three markers on said map; three elongated rack members rotatably disposed in successive planes above said map; three pivots engageable respectively with said three markers, each of said pivots being slidably attached to one of said rack members, whereby said pivots may be positioned respectively at a plurality of points along said rack members; means to lock each of said pivots at any of said points; and shackle means, said shackle means including three individually rotatable clevises to respectively retain the three rack members, pinion means in engagement with said rack members, and means to actuate said pinion means whereby to move said rack members uniformly longitudinally relative to said pinion member.

6. A geometrical instrument, comprising a pinion shaft; means to rotate said shaft; three pinions, uniformly rotatable upon rotation of said shaft; three clevises mounted upon said shaft and individually rotatable about said shaft; a pointer mounted upon said shaft; three elongated arms; each arm being provided with a rack, and scale markings, and a depending finger; each arm extending through one of said clevises; each rack being in mesh with one of said pinions; each arm being individually rotatable about the pinion in mesh with its rack; each arm being longitudinally movable through one of said clevises upon rotation of said shaft; three slides mounted respectively upon said arms, said slides being respectively slidable longitudinally to a plurality of positions along said arms; means to retain said slides at any of said positions; indicating means upon each of said slides for indicating its position relative to the scale markings upon the arm on which it is mounted; three depending pivots mounted respectively upon said slides; and three bearings engageable respectively with the said pivots.

GILBERT SWIFT.

REFERENCES CITED

The following references are of record in the file of this patent:

UNITED STATES PATENTS

| Number | Name | Date |
|---|---|---|
| 1,046,362 | Adams | Dec. 3, 1912 |
| 1,661,095 | Rowe | Feb. 28, 1928 |
| 2,026,459 | Caretta | Dec. 31, 1935 |
| 2,355,452 | Linkowski | Aug. 8, 1944 |

FOREIGN PATENTS

| Number | Country | Date |
|---|---|---|
| 14,234 | France | Nov. 27, 1911 |
| 342,893 | Great Britain | Feb. 12, 1931 |
| 770,759 | France | July 9, 1934 |